(12) United States Patent
Lee et al.

(10) Patent No.: US 10,228,153 B2
(45) Date of Patent: Mar. 12, 2019

(54) TEMPERATURE ADJUSTMENT METHOD AND APPARATUS

(71) Applicant: Samsung Electronics Co., Ltd., Suwon-si (KR)

(72) Inventors: Sooyoung Lee, Suwon-si (KR); Dong Seop Lee, Suwon-si (KR); Manjib Han, Seongnam-si (KR); Hyejung Cho, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 296 days.

(21) Appl. No.: 14/831,348

(22) Filed: Aug. 20, 2015

(65) Prior Publication Data

US 2016/0054019 A1 Feb. 25, 2016

(30) Foreign Application Priority Data

Aug. 21, 2014 (KR) .......................... 10-2014-0108905

(51) Int. Cl.
*F24F 11/30* (2018.01)
*F24F 11/62* (2018.01)
(Continued)

(52) U.S. Cl.
CPC .............. *F24F 11/62* (2018.01); *F24F 11/30* (2018.01); *F24F 11/70* (2018.01); *F24F 11/46* (2018.01); *F24F 11/47* (2018.01); *F24F 11/56* (2018.01); *F24F 11/64* (2018.01); *F24F 2110/10* (2018.01); *F24F 2110/12* (2018.01); *F24F 2110/70* (2018.01); *F24F 2120/10* (2018.01);
(Continued)

(58) Field of Classification Search
CPC .... G05D 23/19; F24F 11/006; F24F 11/0012; F24F 11/0034; F24F 11/0076; F24F 11/0086; F24F 2011/0026; F24F 2011/0058; F24F 2011/0063; F24F 2011/0068; F24F 2011/0075; F24F 2011/0094; F24F 2011/0047; F24F 2011/0013; F24F 2011/0046; Y02B 30/78
USPC ........................................................ 700/276
See application file for complete search history.

(56) References Cited

U.S. PATENT DOCUMENTS

| | | | |
|---|---|---|---|
| 6,185,483 B1 | 2/2001 | Drees | |
| 8,600,571 B2 | 12/2013 | Dillon et al. | |
| 2011/0031322 A1* | 2/2011 | Zou | ...................... F24F 3/0442 236/1 B |
| 2011/0140648 A1 | 6/2011 | Lee | |

(Continued)

*Primary Examiner* — Ronald D Hartman, Jr.
(74) *Attorney, Agent, or Firm* — McAndrews, Held & Malloy, Ltd.

(57) ABSTRACT

A method and a temperature adjustment apparatus of adjusting an indoor temperature includes: predicting a temperature change pattern of a first rate time zone that is reached after an operation of a Heating, Ventilation, and Air Conditioning (HVAC) system, based on an indoor temperature change pattern extracted from information stored; predicting a power consumption of the HVAC system based on the predicted temperature change pattern; and scheduling a discharging power quantity of an Energy Storage System (ESS) battery based on the predicted power consumption of the HVAC system in the first rate time zone, which is reached after the operation. The temperature adjustment method and the apparatus may schedule a discharging power quantity of the ESS battery in consideration of power consumption predicted by the temperature adjustment apparatus, external environmental factors, and characteristics of the ESS battery, thereby optimizing the rate reduction effect.

18 Claims, 16 Drawing Sheets

(51) Int. Cl.

| | |
|---|---|
| *F24F 11/70* | (2018.01) |
| *F24F 11/56* | (2018.01) |
| *F24F 110/12* | (2018.01) |
| *F24F 140/50* | (2018.01) |
| *F24F 110/70* | (2018.01) |
| *F24F 11/64* | (2018.01) |
| *F24F 120/10* | (2018.01) |
| *F24F 11/47* | (2018.01) |
| *F24F 130/10* | (2018.01) |
| *F24F 110/10* | (2018.01) |
| *F24F 11/46* | (2018.01) |
| *F24F 140/60* | (2018.01) |
| *F24F 130/00* | (2018.01) |

(52) U.S. Cl.
CPC ....... *F24F 2130/00* (2018.01); *F24F 2130/10* (2018.01); *F24F 2140/50* (2018.01); *F24F 2140/60* (2018.01)

(56) References Cited

U.S. PATENT DOCUMENTS

| | | | |
|---|---|---|---|
| 2012/0123594 A1* | 5/2012 | Finch | G05B 15/02 700/278 |
| 2012/0232701 A1* | 9/2012 | Carty | G05B 15/02 700/277 |
| 2012/0318490 A1* | 12/2012 | Kopp | F24F 11/0009 165/237 |
| 2013/0261808 A1* | 10/2013 | Besore | F24F 11/0015 700/278 |
| 2014/0156083 A1* | 6/2014 | Burke | G05B 15/02 700/276 |
| 2014/0214213 A1* | 7/2014 | Rockenfeller | G05D 23/1923 700/276 |
| 2014/0365017 A1* | 12/2014 | Hanna | F24F 11/001 700/276 |
| 2016/0018124 A1* | 1/2016 | Yamamoto | F24F 11/00 700/276 |
| 2016/0041574 A1* | 2/2016 | Maitani | G06Q 50/16 700/291 |

* cited by examiner

| DATE | OUTDOOR (TEMPERATURE/ HUMIDITY) | INDOOR (TEMPERATURE/ HUMIDITY) | INDEX FOR PEOPLE IN ROOM | OPENING/CLOSING OF WINDOW | OFFICE EQUIPMENT |
|---|---|---|---|---|---|
| 2011.6.23 | 27.5 DEGREES, 72% | 27.5 DEGREES, 72% | 30 PERSONS | OPENING | HEAT VALUE ADDITION |
| 2011.6.30 | 27 DEGREES, 60% | 27 DEGREES, 60% | 40 PERSONS | CLOSING | SAME HEAT VALUE |
| 2012.7.23 | 26 DEGREES, 65% | 26 DEGREES, 65% | 50 PERSONS | CLOSING | SAME HEAT VALUE |
| 2013.6.30 | 27 DEGREES, 65% | 27 DEGREES, 65% | 40 PERSONS | CLOSING | SAME HEAT VALUE |

FIG. 4

TEMPERATURE ADJUSTMENT METHOD AND APPARATUS

RELATED APPLICATION

This application claims priority from and the benefit under 35 U.S.C. § 119(a) of Korean Patent Application No. 10-2014-0108905, filed on Aug. 21, 2014, which is hereby incorporated by reference for all purposes as if fully set forth herein.

BACKGROUND

The present disclosure relates generally to energy management, and more particularly, to a temperature adjustment method and apparatus using energy management.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Meanwhile, as to a method in which a conventional energy management device schedules charging/discharging power quantities of an Energy Storage System (ESS) battery in relation to a variable power rate, the ESS is charged in a light load rate time zone, and is collectively discharged in a high load rate time zone. Accordingly, at the time of linking to a specific device, such as a Heating, Ventilation, and Air Conditioning (HVAC) system, a load prediction is difficult to make, so that optimal utilization of the storage capacity of the ESS battery is difficult. Conventionally, the power quantity that is used during the high load time cannot be predicted in advance, and thereby the rate reduction effect using the charging/discharging of the ESS cannot be optimized.

That is, even in a case in which the ESS is charged during the light load rate time zone, external electrical power is used when excessively using the charging capacity of the ESS during the high load time, which leads to the generation of the excess rate. In addition, the residual quantity is generated when insufficiently using the charging capacity of the ESS during the high load time, which leads to a reduction in the Return On Investment (ROI).

SUMMARY

The present disclosure provides a temperature adjustment method and apparatus, in which a temperature adjustment apparatus may predict power consumption in advance from past data based on information obtained through a test operation, and may schedule a discharging power quantity of an ESS battery in consideration of the predicted power consumption, external environmental factors, and characteristics of the ESS battery.

The present disclosure also provides a method of adjusting an indoor temperature includes: predicting an indoor temperature change pattern of a first rate time zone which is reached after an operation of a Heating, Ventilation, and Air Conditioning (HVAC) system, based on an indoor temperature change pattern extracted from information stored; predicting the power consumption of the HVAC system based on the predicted temperature change pattern; and scheduling a discharging power quantity of an ESS (Energy Storage System) battery based on the predicted power consumption of the HVAC system in the first rate time zone, which is reached after the operation.

The present disclosure also provides a temperature adjustment apparatus includes: an external information acquisition unit that acquires information from the outside; a storage unit that stores the acquired information and information stored; and a control unit that controls to: predict an indoor temperature change pattern in a first rate time zone, which is reached after an operation of an HVAC system based on an indoor temperature change pattern extracted from the information stored; predict power consumption of the HVAC system based on the predicted temperature change pattern; and schedule a discharging power quantity of an ESS battery based on the predicted power consumption of the HVAC system in the first rate time zone, which is reached after the operation.

The present disclosure also provides a temperature adjustment apparatus that may predict power consumption from the past database, which is information stored, based on information obtained through a test operation. Accordingly, by scheduling the discharging power quantity of the ESS battery in consideration of the predicted power consumption, external environmental factors, and characteristics of the ESS battery, the rate reduction effect may be optimized.

BRIEF DESCRIPTION OF THE DRAWINGS

The above and other objects, features, and advantages will be more apparent from the following detailed description in conjunction with the accompanying drawings, in which:

FIG. 4 illustrates information about temperature increase factors for a plurality of dates, which is stored in advance in a storage unit of an energy management device in the form of a temperature adjustment apparatus according to an embodiment of the present disclosure;

DETAILED DESCRIPTION OF THE EXEMPLARY EMBODIMENTS

Figure 1:
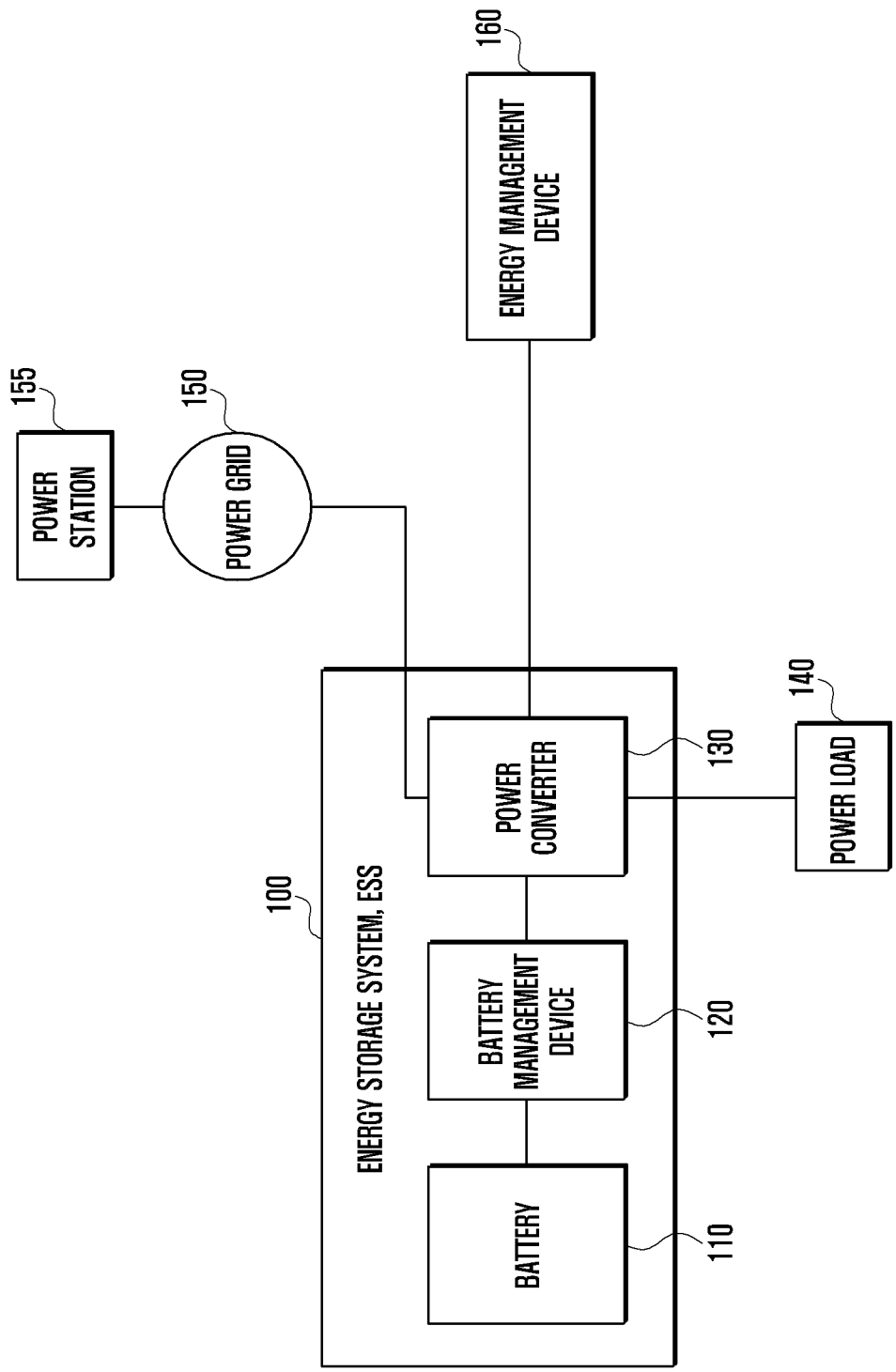
FIG. 1 illustrates components of a temperature adjustment system according to an embodiment of the present disclosure.

Hereinafter, embodiments of the present disclosure will be described in detail with the accompanying drawings.

In describing the exemplary embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

The specific terms used herein are provided for ease of understanding the present disclosure, and such specific terms may be changed into other forms without departing from the spirit and scope of the present disclosure.

FIG. 1 illustrates components of a temperature adjustment system according to an embodiment of the present disclosure.

Referring to FIG. 1, a temperature adjustment system according to an embodiment of the present disclosure may include an Energy Storage System (ESS) 100, a battery 110, a battery management device 120, a power converter 130, a power load 140, a power grid 150, a power station 155, an energy management device 160. The ESS 100 charges the battery 110 and stores energy.

The ESS 100 may discharge the battery 110 and supply the stored energy to the power load 140. The ESS 100 may include the battery 110, the battery management device 120, and the power converter 130, as illustrated in FIG. 1.

The battery 110 is an energy storage area in which energy is stored, and is charged with electrical power supplied through the power grid 150. The battery 110 discharges the stored energy and supplies the discharged energy to the power load 140.

The battery management device 120 may detect a voltage, a current, a temperature, and the like of the battery 110. The battery management device 120 may perform a protection function such as preventing overcharging or overdischarging by controlling the charging/discharging power quantities of the battery 110 at an appropriate level. The battery management device 120 may perform cell balancing of the battery 110, and may ascertain the residual quantity of the battery 110. The cell balancing is to balance charging and discharging which are not uniformly carried out due to characteristics of each of battery cells when the battery cells are connected in series. In particular, in the present disclosure, the battery management device 120 may be used to indicate a general Battery Management System (BMS).

The power converter 130 may receive power supply from the power grid 150, and may store the received power supply in the battery 110. The power converter 130 may convert electrical characteristics (alternating or direct current, voltage, frequency, etc.) in order to supply electrical power to the power load 140.

In addition, the power converter 130 may supply to the power load 140, energy supplied from the power station 155 through the power grid 150, or may charge the battery 110. The power converter 130 may discharge the battery 110, and may supply the energy charged in the battery 110 to the power load 140. In this instance, the charging/discharging of the battery 110 is operated in consideration of the type or characteristic information of the battery 110. In particular, in the present disclosure, the power converter 130 may be referred to as a general Power Conversion System (PCS).

The power grid 150 is connected to the power station 155 and serves to supply external electrical power to the power converter 130.

According to an embodiment of the present disclosure, the energy management device 160 may be in the form of a temperature adjustment apparatus that manages energy and adjusts a temperature of room. In such embodiments, the energy management device 160 controls the power converter 130 and the battery management device 120 of the ESS 100 using external information obtained from the exterior information acquisition unit. According to an embodiment of the present disclosure, the energy management device 160 may adjust the temperature by managing the electrical power supplied through the power grid 150 and may charge/discharge power of the battery 110. That is, the energy management device 160 may predict the power consumption of a time zone after a test operation based on temperature change information, the external information, and past temperature change information obtained in such a manner that the power load 140 is test-operated by the power converter 130. By controlling the power converter 130 and the battery management device 120 based on the predicted power consumption, external factors, characteristics of the battery, or the like, it is possible to control a power supply.

The power load 140 indicates facilities such as homes, buildings, plants, or the like in which electrical power is consumed. In the present disclosure, the power load 140 may include a Heating, Ventilation, and Air Conditioning (HVAC) system that adjusts a temperature of room in buildings.

Figure 2:
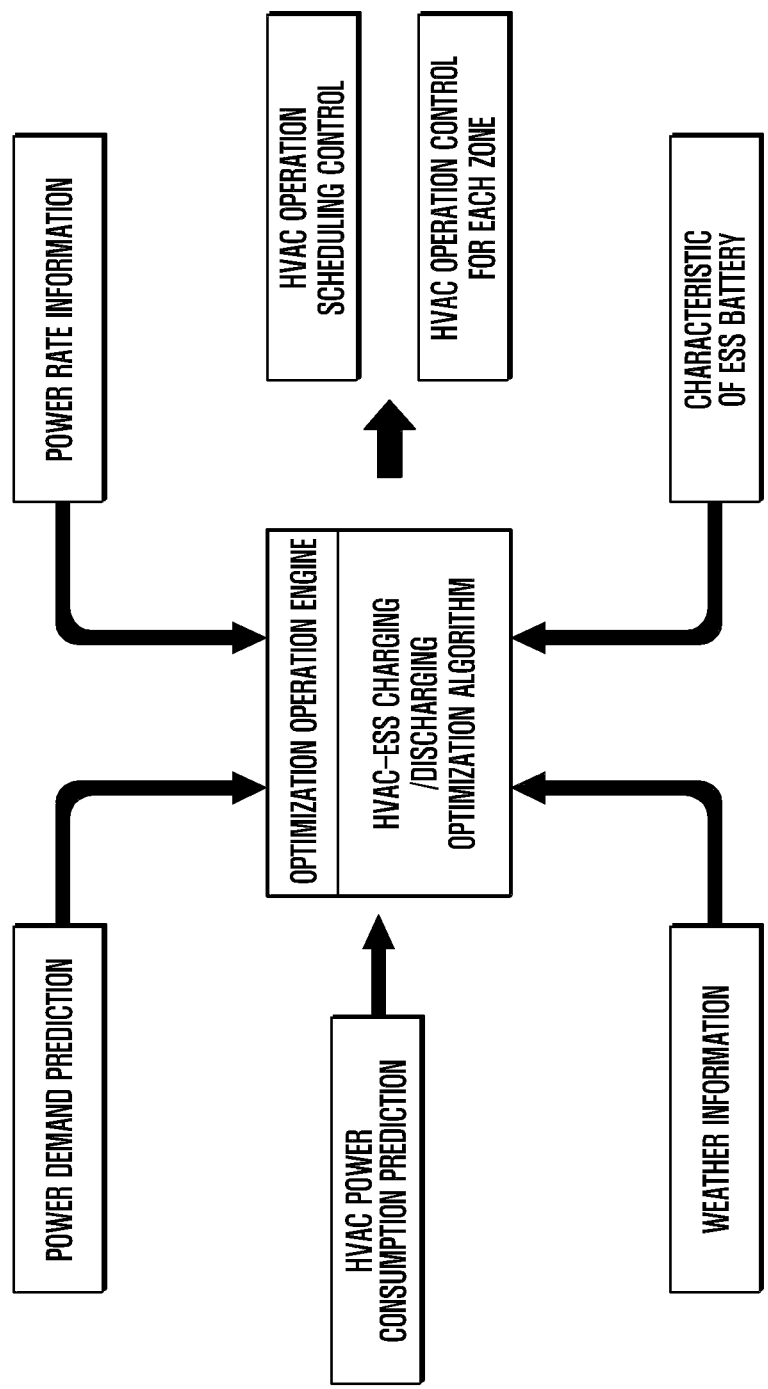
FIG. 2 illustrates a case of modeling a process for generating an optimization algorithm by interlocking a Heating, Ventilation, and Air Conditioning (HVAC) system and an Energy Storage System (ESS) by an energy management device, in the form of a temperature adjustment apparatus according to an embodiment of the present disclosure.

FIG. 2 illustrates a case of modeling a process for generating an optimization algorithm by interlocking an HVAC system and an ESS by an energy management device 160 according to an embodiment of the present disclosure. More specifically, this is a case of modeling a process for optimizing scheduling in which the energy management device 160 supplies external electrical power to the HVAC system (e.g., the power load 140) by discharging electrical power from the ESS 100. In some embodiments, the electrical power has been charged in advance in the ESS as external electrical power in a low rate time zone, without supplying the external electrical power to the HVAC system in a high rate time zone. In the present disclosure, the high rate time zone may be used to indicate a high load time zone and a high load rate time zone. In the present disclosure, a high rate time zone, a middle rate time zone, and a low rate time zone may be determined in advance by the power station 155 that supplies electrical power.

The energy management device 160 may consider the power consumption of the HVAC system, which has been predicted in advance by the energy management device 160, power demand prediction, power rate information, weather information, characteristics of an ESS battery, and the like, in a process of generating the optimization algorithm for HVAC-ESS charging/discharging. The energy management device 160 may schedule the operation of the HVAC system over time using the generated optimization algorithm, and may control the operation of the HVAC system for each zone. The process of generating the optimization algorithm will be described later.

Figure 3:
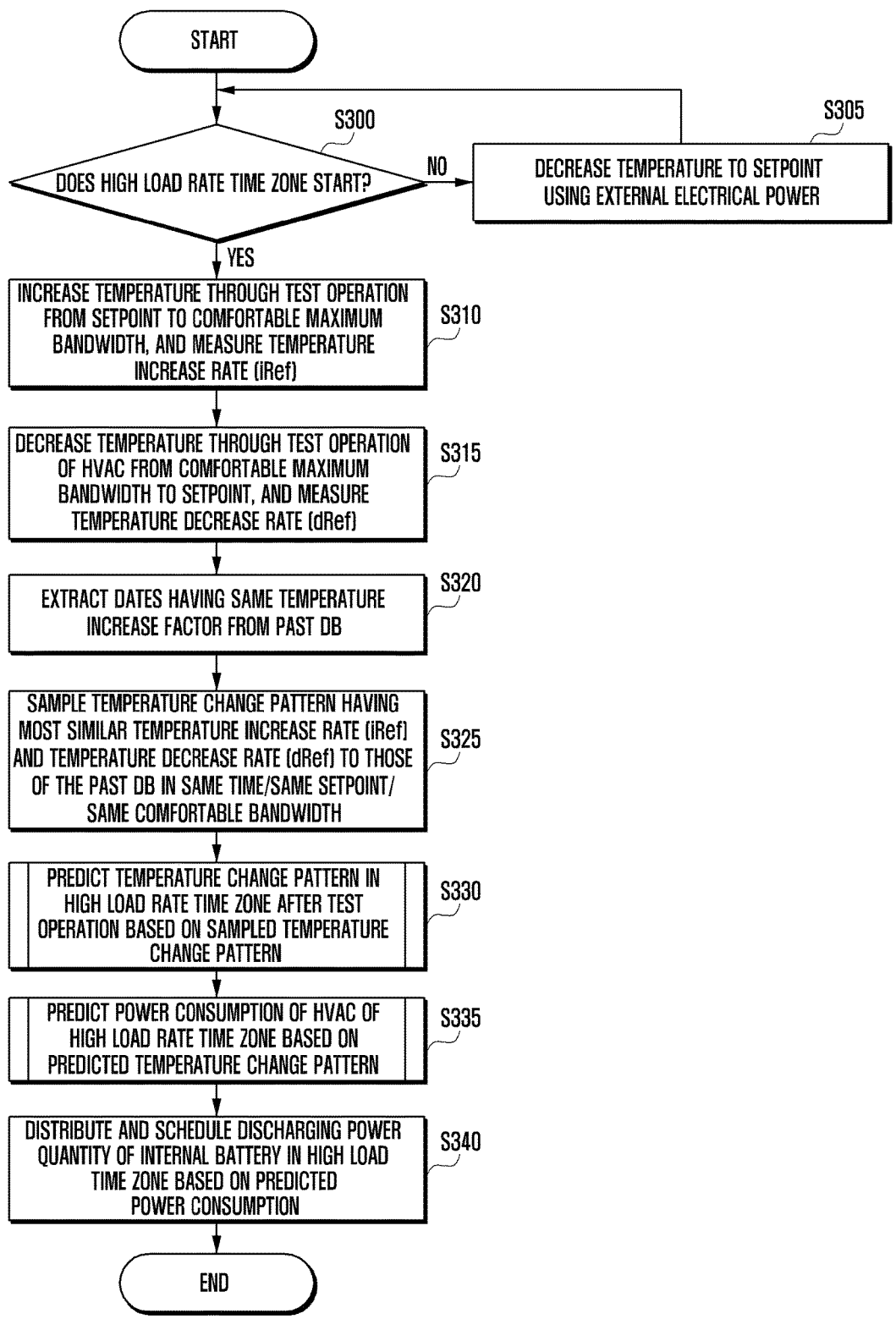
FIG. 3 is flowchart illustrating a process in which an energy management device in the form of a temperature adjustment apparatus according to an embodiment of the present disclosure scheduling a discharging power quantity of an ESS battery.

FIG. 3 is a flowchart illustrating a process in which the energy management device 160 in the form of a temperature adjustment apparatus according to an embodiment of the present disclosure, scheduling a discharging power quantity of the ESS battery 110.

In operation S300, the energy management device 160 determines whether a high load rate time zone starts. The high load rate time zone means that a rate, which is set in the power station 155 that supplies electrical power, is a predetermined amount or more. Until the high load rate time zone starts, the energy management device 160 decreases a temperature of area whose temperature is to be controlled to a predetermined setpoint using external electrical power in operation S305. The setpoint may be arbitrarily set by a user.

In operation S310, when it is determined by the energy management device 160 that the high load rate time zone starts in operation S300, the energy management device 160 may increase the temperature from the setpoint to an arbitrary point of a comfortable bandwidth, for example, the peak, and may obtain a temperature increase rate (iRef). The comfortable bandwidth may represent a temperature range in which a user feels comfortable. The temperature increase rate (iRef) may be calculated by a temperature change value per unit time.

The comfortable bandwidth may be a pleasant temperature range. The comfortable bandwidth may be preset by a user, and may be variable. An initial value of the comfortable bandwidth may be determined in consideration of a Predicted Mean Vote (PMV) which is an index for measuring comfortableness. The PMV refers to a mean vote value obtained by averaging votes from people that a particular temperature is warm in a given environment.

The energy management device 160 (of FIG. 1) may obtain a temperature increase rate (iRef) by showing a temperature change pattern over time by a diagram and by raising the temperature from the setpoint to the arbitrary point of the comfortable bandwidth, for example, to the peak. The temperature increase rate (iRef) may be a mean gradient calculated after the temperature change pattern over time is shown by a diagram and by raising the temperature. The temperature change pattern may be a graph in which a temperature change is recorded over time. The mean gradient may be calculated based on a temperature increment and a time taken for the temperature to increase. For example, mean gradient=increased temperature/time taken for the temperature to increase. The time taken for the temperature to increase may be a time reaching from a high load start point of time to a point of time when the gradient of the increased temperature change pattern is '0'. The high load start point of time may be a time when the temperature is the setpoint. The point of time when the gradient of the increased temperature change pattern is '0' may be a time when the temperature reaches the arbitrary point of the comfortable bandwidth, for example, the peak.

In operation S315, the energy management device 160 may obtain a temperature decrease rate (dRef) by decreasing the temperature from the arbitrary point of the comfortable bandwidth, for example, the peak to the setpoint. The temperature decrease rate (dRef) may be a mean gradient calculated after the temperature change pattern over time is shown by a diagram and by decreasing the temperature. The mean gradient may be calculated based on temperature decrease and time taken for the temperature to decrease. For example, mean gradient=temperature decrease/time taken for the temperature to decrease. The time taken for the temperature to decrease may be a time reaching from a point of time when the gradient of the temperature change pattern is '0' after the increase of the temperature to a point of time when the gradient of the temperature change pattern is '0' after the decrease of the temperature. The point of time when the gradient of the temperature change pattern is '0' after the increase of the temperature may be a time when the temperature reaches an arbitrary point of the comfortable bandwidth, for example, the peak. The point of time when the gradient of the temperature change pattern is '0' after the decrease of the temperature may be a time when the temperature reaches the setpoint by the operation of the HVAC system.

In operations S310 and S315, the energy management device 160 may obtain the gradient of the temperature change pattern including the temperature increase rate (iRef) and the temperature decrease rate (dRef). The obtained gradient may be stored in the storage unit. In addition, the energy management device 160 may acquire temperature increase factors during a test operation bandwidth from an external information acquisition unit (not shown), and may store the acquired temperature increase factors in the storage unit. The temperature increase factor may include at least one of a number of people in a room, a temperature of the people in the room, a difference between an indoor temperature and an outdoor temperature, building thermal conductivity, an effect of a heat generator, an indoor humidity, a degree of opening of a building, a solar radiation heat cutoff degree, and a density of adjacent buildings.

In operation S320, the energy management device 160 may extract dates that have the same temperature increase factor as the acquired temperature increase factor from the past database (DB). Alternatively, the energy management device 160 may extract a plurality of dates that have the temperature increase factor within a predetermined error range with the acquired temperature increase factor from the past DB. The predetermined error range may be determined and stored by the manufacturer of the energy management device 160.

The past DB may be information stored by the energy management device 160. The past DB may include indoor temperature change pattern information depending on a temperature adjustment of the HVAC system by the temperature increase factor for each of the past plurality of dates and a user setting. The temperature increase factor for each of the past dates of the past DB, as illustrated in FIG. 4.

In operation S325, the energy management device 160 may sample the temperature change pattern having a similar temperature increase rate (iRef) and temperature decrease rate (dRef) (that is, the gradient of the temperature change pattern) to the obtained gradient of the temperature change pattern including the temperature increase rate (iRef) and the temperature decrease rate (dRef), in the same time, the same setpoint, and the same comfortable bandwidth among the extracted dates. Alternatively, the energy management device 160 may sample the temperature change pattern having the gradient of a similar temperature change pattern to the obtained gradient of the temperature change pattern including the temperature increase rate (iRef) and the temperature decrease rate (dRef), in the time within the predetermined error range, the setpoint, and the comfortable bandwidth. The sampling of the temperature change pattern may include extracting the temperature change pattern from the information stored. The extracting of the temperature change pattern represents extracting, from the information in the past DB within the energy management device 160, the temperature change pattern having the gradient of a similar temperature change pattern to that of the past DB among the temperature change patterns of the extracted dates.

In operation S330, the energy management device 160 predicts the temperature change pattern of the high rate time zone after the test operation, based on the extracted temperature change pattern. The energy management device 160 predicts the temperature change pattern based on the temperature change pattern extracted from the past DB, which is the information stored in advance, using a similar gradient and the same temperature increase factor to and as the temperature increase rate (iRef) and the temperature decrease rate (dRef), which are acquired from the test operation bandwidth. The energy management device 160 may correct an error between the gradient of the extracted temperature change pattern and the acquired gradient, and may thereby predict the temperature change pattern of the high rate time zone after the test operation. More specific description thereof will be made below in FIG. 5.

In operation S335, the energy management device 160 predicts the power consumption of the HVAC system over time in the high load time zone, based on the predicted temperature change pattern. The past DB, which is the information stored in advance in a storage unit (not shown) of the energy management device 160, may further include the power consumption of the HVAC system over time for each date. The energy management device 160 may extract, from the information stored in advance, the power consumption of the HVAC system over time on the date in which the temperature change pattern is extracted. The energy management device 160 may predict the power consumption of the high load time zone after the test operation, based on the extracted power consumption of the HVAC system over time and the predicted temperature change pattern. More specific description thereof will be made below in FIG. 6.

In operation S340, the energy management device 160 distributes and schedules the discharging power quantity of an internal battery of the ESS in the high load time zone, based on the predicted power consumption of the HVAC system. The energy management device 160 may acquire information about the power quantity of the battery 110 from the battery management device 120. The power quantity of the battery 110 refers to a power quantity that is currently charged in the battery so that it may be dischargeable. The energy management device 160 distributes, over time in the high rate time zone which is reached after the test operation, the acquired discharging power quantity of the battery, based on the predicted power consumption over time of the HVAC system. Specific description of a case in which the predicted power consumption of the HVAC system exceeds the acquired power quantity of the battery 110 will be made below in FIG. 11.

Figure 5:
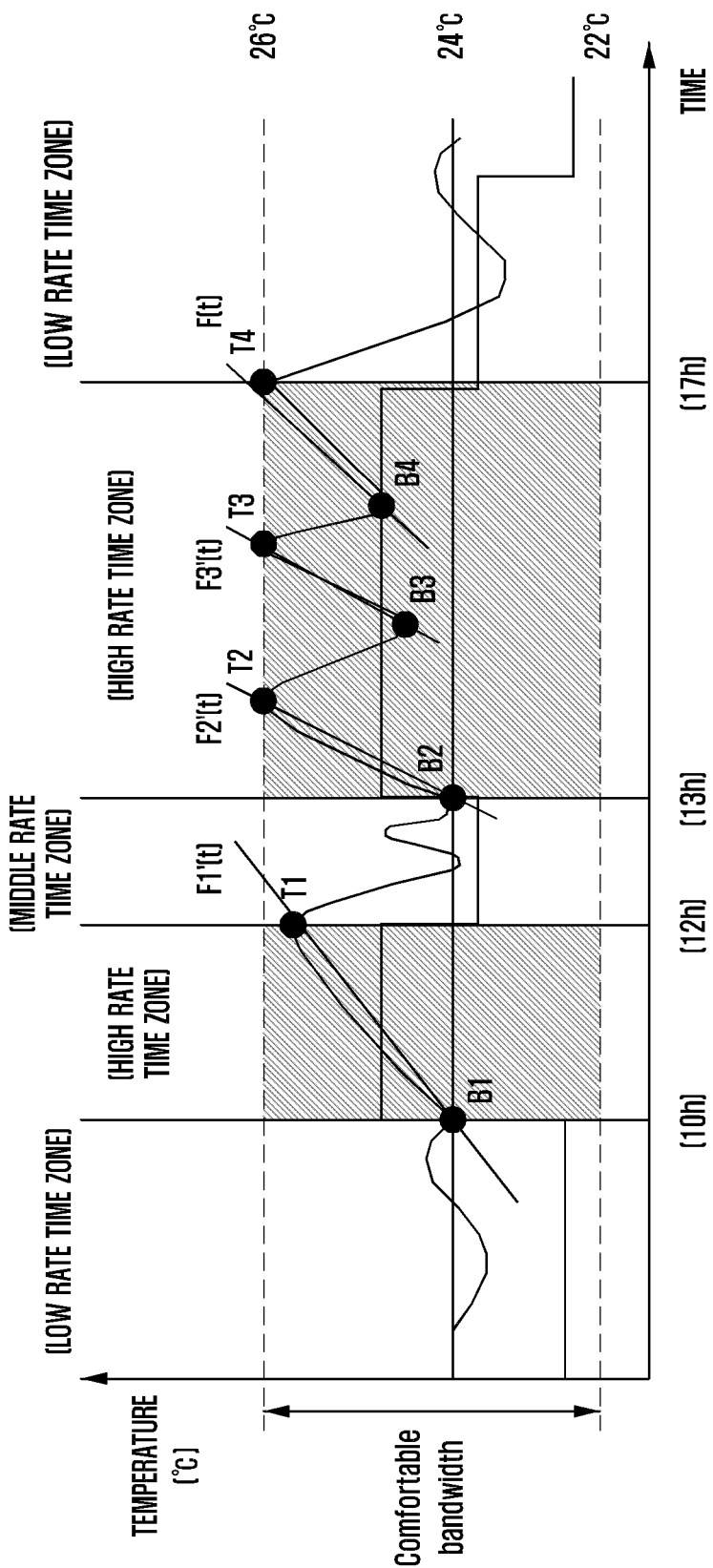
FIG. 5 illustrates a case in which an energy management device in the form of a temperature adjustment apparatus according to an embodiment of the present disclosure predicting a temperature change pattern.

FIG. 5 illustrates a case in which an energy management device which is a temperature adjustment apparatus, according to an embodiment of the present disclosure, predicts a temperature change pattern.

FIG. 5 illustrates a case in which the temperature change pattern of the high rate time zone after the test operation as results of operations S310 to S330 of FIG. 3. As described above, the energy management device 160 decreases the temperature to a predetermined setpoint B1 using the external electrical power until 10 h, which occurs until the high rate time zone starts. The setpoint B1 of FIG. 5 has been set as 24° C.

Then, when the high rate time zone starts at 10 h, the energy management device 160 (of FIG. 1) increases the temperature until T1 at 12 h, which is a point of time when the high rate time zone is terminated, using a high-efficient operation of the HVAC system within a comfortable bandwidth. The high-efficient operation of the HVAC system may include a partial load operation of an outdoor unit (not shown) of the HVAC system and an operation using outdoor air circulation through blowing using a fan (not shown). In addition, when the indoor temperature reaches a maximum temperature within the comfortable bandwidth before T1 at 12 h, the energy management device 160 performs an operation of decreasing the temperature. The energy management device 160 may obtain temperature increase rate information by acquiring a gradient F1'(t) of a temperature change pattern graph F(t) between B1 and T1. The energy management device 160 may use the gradient $F1(t)'$ obtained in this manner when predicting the temperature change pattern of the time zone after the test operation.

In addition, the energy management device 160 may decrease the temperature to a setpoint, for example, 24° C. in at time B2, which is before the high rate time zone starts, in a zone T1 to B2, which is a middle rate time zone. In addition, the energy management device 160 may acquire a gradient F2'(t) of the temperature change pattern graph, which is obtained after increasing the temperature by selectively performing the high-efficient operation of the HVAC system after 13 h, which is a time when the high rate time zone starts, and may thereby obtain the temperature increase rate information. This is to obtain more accurate results than those obtained by predicting the temperature change pattern only using the gradient F1 '(t) obtained through a single test operation. The gradients F1'(t) and F2'(t) may be affected by the material of a building, the direction of the building, a difference between the indoor temperature and the outdoor temperature, and the number of people in the room, and may be used as a reference for extracting the past similar temperature change pattern in order to predict the temperature change pattern after the test operation.

In addition, selectively, the energy management device 160 may calculate a temperature distribution function of the high rate time zone, as the reference for extracting the temperature change pattern. The temperature distribution function may be represented by the following Equation 1.

$$F(x) = \alpha t \cdot (Wout - Win) + \beta \cdot Ot \cdot On + \gamma margin \quad \text{(Equation 1)}$$

Here, Win denotes the indoor temperature over time, Wout denotes the outdoor temperature over time, α t denotes the influence of the difference between the indoor temperature and the outdoor temperature on the indoor temperature, Ot denotes the temperature of people in the room, On denotes the number of people in the room, β denotes the influence of the people in the room on the indoor temperature, and γmargin denotes a margin of temperature distribution.

As shown in Equation 1, the temperature distribution function of the high rate time zone may be calculated in consideration of building thermal conductivity, a heat generator, indoor humidity, an opening degree of a building, a solar radiation heat cutoff degree, the density of adjacent buildings, and the like, which are other factors that affect the temperature distribution, as well as the difference between the indoor temperature and the outdoor temperature, the temperature of the people in the room, and the number of people in the room.

The energy management device 160 may extract the temperature change pattern which is similar to the temperature distribution function of the high rate time zone from the past DB, which is the information stored in advance in the storage unit, in order to predict the temperature change pattern after the test operation.

The energy management device 160 may predict the temperature change pattern after the test operation, using the temperature change pattern extracted from the past DB. In addition, the energy management device 160 may predict the power consumption over time of the HVAC system after the test operation, using the power consumption of the HVAC system of the date, in which the temperature change pattern is extracted from the past DB, and the predicted temperature change pattern. The power quantity, which is charged in the ESS battery 110 of FIG. 1, may be distributed, using a zone in which the temperature is increased and decreased depending on the predicted power consumption in the power consumption zone, as one period. The power quantity charged in the ESS battery is identical to the discharging power quantity of the ESS battery. This has been described in operations S310 to S330 of FIG. 3.

The energy management device 160 may adjust temperatures B3 and B4, which are temperatures which start to be increased after the decrease of the temperature in the predicted temperature change pattern, according to the power quantity charged in the ESS battery and the outdoor temperature in the operation of distributing the power quantity charged in the ESS battery over time. Due to the changes in B3 and B4, the discharging period of the ESS battery may be also adjusted.

Figure 6:
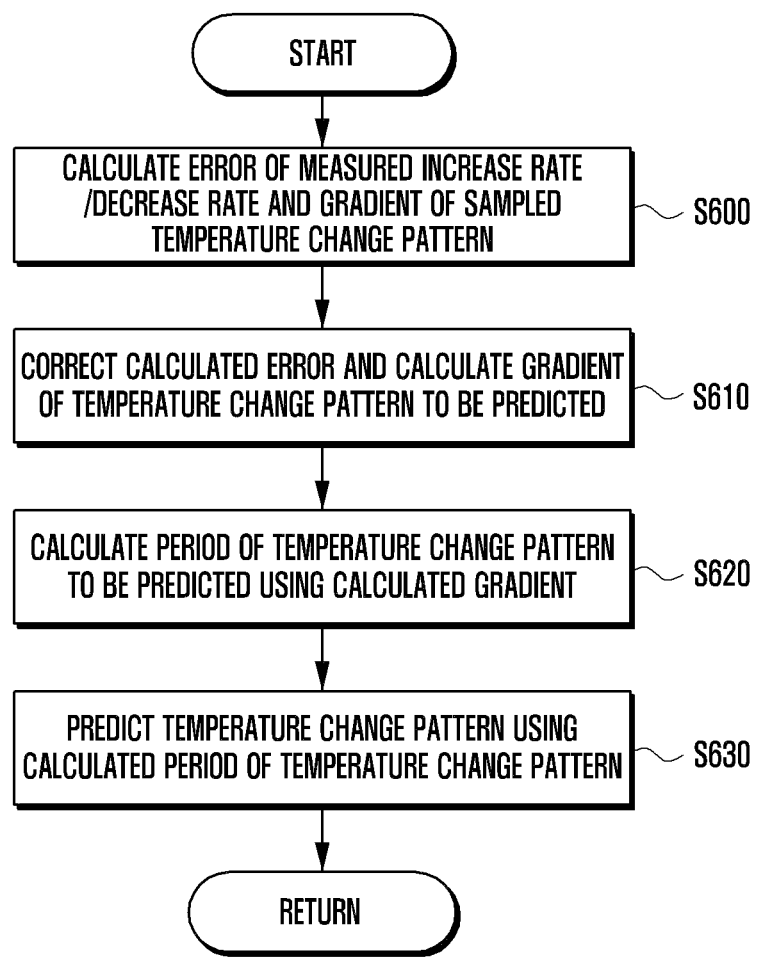
FIG. 6 is a flowchart illustrating a case of predicting a temperature change pattern in a high load rate time zone by specifying operation S330 of FIG. 3 according to an embodiment of the present disclosure.

FIG. 6 is a flowchart illustrating a case of predicting a temperature change pattern in a high load rate time zone by specifying operation S330 of FIG. 3 according to an embodiment of the present disclosure.

The energy management device 160 may predict the temperature change pattern of the high load rate time zone after the test operation bandwidth, based on the temperature change pattern extracted from the past DB, which is the information stored in advance.

More specifically, in operation S600, the energy management device 160 may calculate an error between the gradient of the temperature change pattern including the temperature increase rate and the temperature decrease rate, which are obtained in operations S310 and S315 and the gradient of the temperature change pattern sampled in operation S325. It is assumed that the function of the temperature change pattern sampled in operation S325 is G(t) and the function of the temperature change pattern obtained in operations S310 and S315 is F(t). When it is assumed that the zone in which the temperature distribution is increased and then decreased is one period, the energy management device 160 may calculate a gradient G1'(t) when the temperature is increased in the first period of the function of the sampled temperature change pattern, using G1'(t)=increased temperature/time taken for the temperature to increase. In the same manner, with respect to G2'(t), G3'(t), . . . , and the obtained function of the temperature change pattern, F1'(t), F2'(t), . . . may be calculated. The error may be calculated using a difference (G1'(t)−F1'(t), G2'(t)−F2'(t), G3'(t)−F3'(t), . . . ) between gradients for each period of G(t) and F(t).

In operation S610, the energy management device 160 may correct the sampled temperature change pattern by the calculated error and may thereby calculate the gradient of the temperature change pattern after the test operation. More specifically, based on the error in the zone in which the temperature change pattern is obtained, the energy management device 160 may correct the sampled temperature change pattern in a temperature change pattern prediction zone after the test operation. For example, by deriving the mean value of the calculated errors, the derived mean value may be used to correct the sampled temperature change pattern.

In operation S620, the energy management device 160 may calculate the period of the temperature change pattern to be predicted using the calculated gradient. In operation S630, the energy management device 160 may predict the temperature change pattern using the calculated period of the temperature change pattern.

Figure 7:
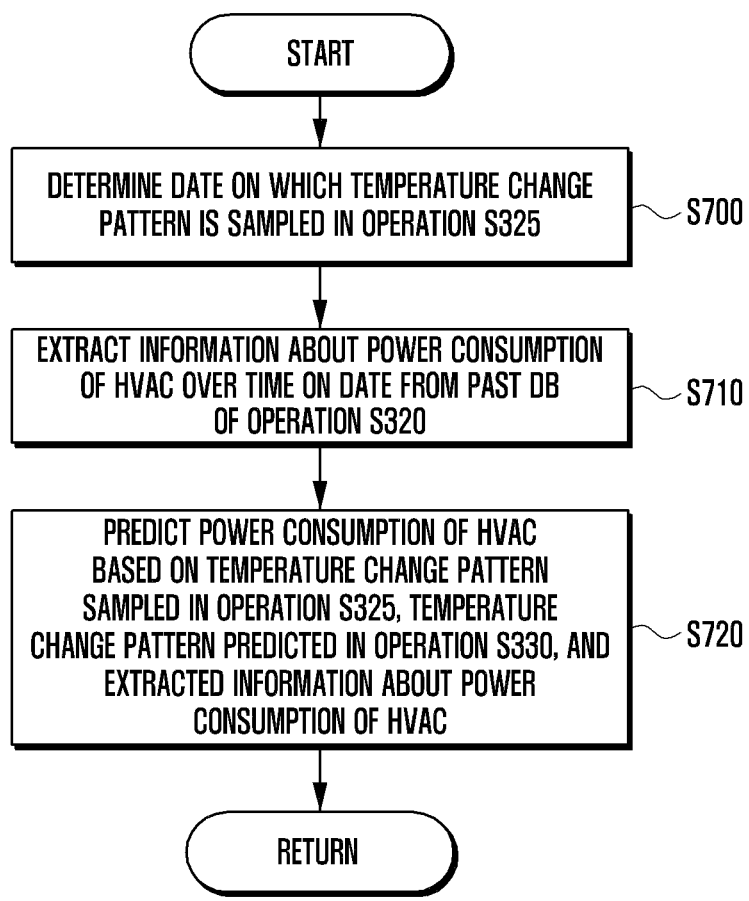
FIG. 7 is a flowchart illustrating a case of predicting power consumption of an HVAC system in a high load rate time zone by specifying operation S335 of FIG. 3 according to an embodiment of the present disclosure.

FIG. 7 is a flowchart illustrating a case of predicting power consumption of an HVAC system in a high load rate time zone by specifying operation S335 of FIG. 3 according to an embodiment of the present disclosure.

The energy management device 160 may predict the power consumption of the HVAC system of the high load time zone after the test operation, based on the predicted temperature change pattern. More specifically, the information stored in advance in the storage unit of the energy management device 160 may include information about the power consumption of the HVAC system over time for each of the past dates. In operation S700, the energy management device 160 determines the date in which the temperature change pattern is extracted because the temperature change pattern has a similar gradient to the gradient obtained by the test operation in operation S325. In operation S710, the energy management device 160 extracts the information about the power consumption of the HVAC system over time of the determined date from the information stored in advance. In operation S720, the energy management device 160 corrects the extracted temperature change pattern, that is, the error in operation S330 and thereby predicts the power consumption of the HVAC system over time after the test operation based on the predicted temperature change pattern and the extracted power consumption of the HVAC system. For example, the energy management device 160 may correct the extracted power consumption of the HVAC system, in the same ratio as the error which has been corrected in order to obtain the predicted temperature change pattern, and may thereby predict the power consumption of the HVAC system over time after the test operation.

Figure 8:
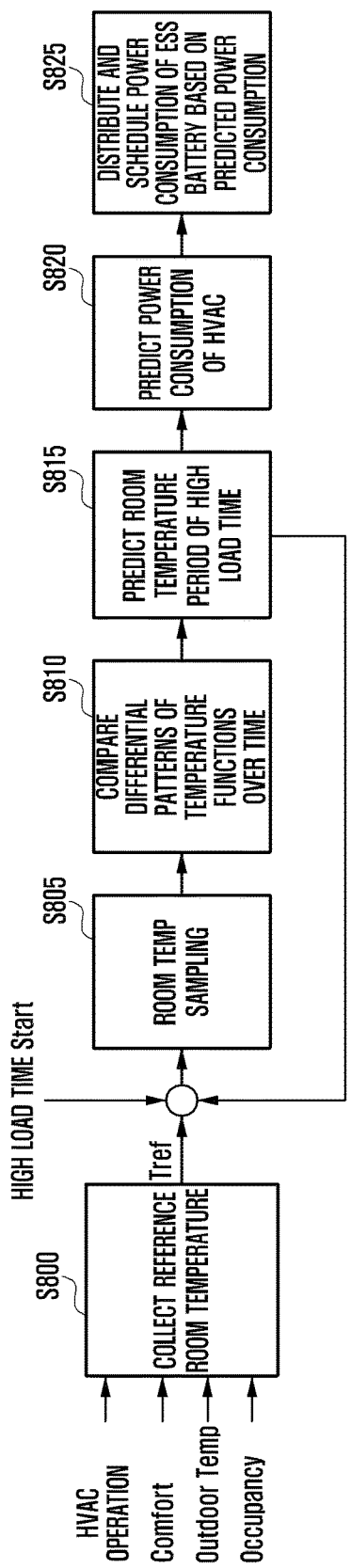
FIG. 8 is a flowchart illustrating a case in which an energy management device, in the form of a temperature adjustment apparatus according to an embodiment of the present disclosure, repeatedly operating in order to accurately predict a temperature change pattern.

FIG. 8 is a flowchart illustrating a case in which an energy management device according to an embodiment of the present disclosure is repeatedly operated in order to accurately predict a temperature change pattern.

The energy management device 160 repeats operations S325 and S330 of FIG. 3 in order to predict the accurate temperature change pattern. This is specified in operations S805 to S815.

In operation S800, the energy management device 160 obtains several kinds of information including a reference room temperature during the test operation of the HVAC system. The information obtained by the test operation may include at least one of a temperature change pattern, a gradient of a temperature change pattern, and a temperature increase factor. The information obtained by the energy management device 160 may be used as a reference for extracting the temperature change pattern from the past DB, which is the information stored in advance in the storage unit of the energy management device 160. Thus, the reference room temperature is used in the same manner as that of the temperature change pattern.

In operation S805, the energy management device 160 extracts the temperature change pattern from the past DB stored in the storage unit of the energy management device 160, using the obtained information. A process of extracting the temperature change pattern is the same as those of operations S310 to S325 of FIG. 3. In operation S810, the energy management device 160 compares differential patterns of temperature functions over time between the temperature change pattern obtained in the test operation bandwidth and the extracted temperature change pattern. The comparison of the differential patterns is to calculate the error of the gradients in the same period in the same manner as those of operations S600 to S610, which have been described in FIG. 6. In addition, in operation S815, the energy management device 160 calculates the period of the temperature change pattern of the high load rate time zone after the test operation zone, using the comparison result between the differential patterns. This is the same as operations S610 to S620 of correcting the calculated error and calculating the gradient of the temperature change pattern to thereby calculate the period of the temperature change pattern.

The energy management device 160 predicts the temperature change distribution by repeatedly performing operations S805 to S815 a second or more times, using the temperature change distribution predicted using the calculated gradient and period. The energy management device 160 may increase the accuracy of the prediction through the repeatedly performed operations.

Figure 9:
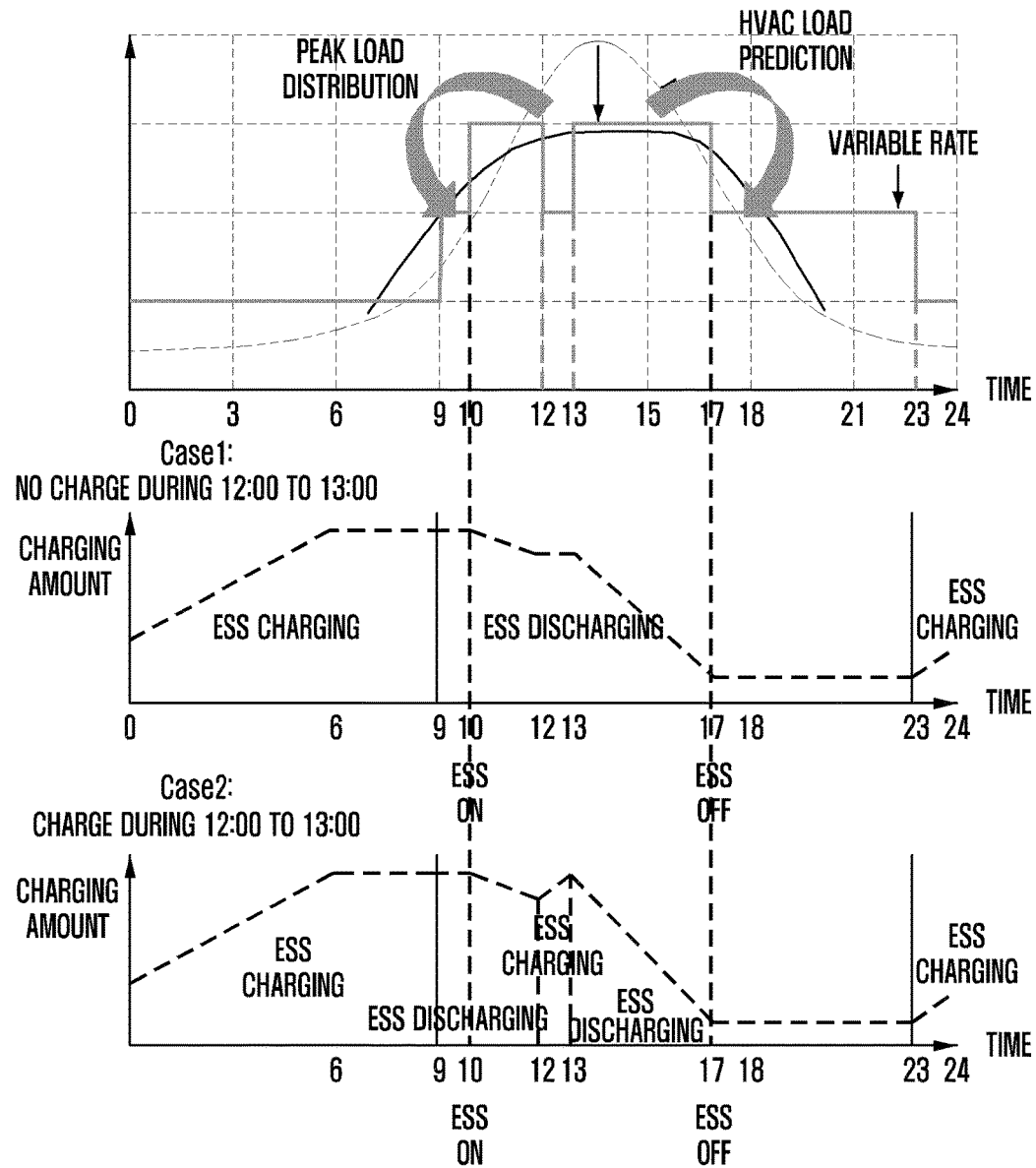
FIG. 9 illustrates a case of scheduling the discharging power quantity of an ESS battery, when an energy management device in the form of a temperature adjustment apparatus according to an embodiment of the present disclosure, is in a middle rate time zone between high rate time zones.

FIG. 9 illustrates a case of scheduling the charging/discharging of an ESS battery (e.g., the ESS battery 110 of FIG. 1), when the energy management device 160 according to an embodiment of the present disclosure is in a middle rate time zone between high rate time zones.

The middle rate time zone refers to a time zone for imposing a rate per unit power, which is lower than the high rate time zone. When there is the middle rate time zone between the high rate time zones after the test operation zone, the energy management device 160 may charge the ESS battery using external electrical power in the middle rate time zone. This is to charge the ESS battery using the external electrical power in the relatively low middle rate time zone, and to stop the use of the external electrical power in the high rate time zone and to use the electrical power of the charged ESS battery, so that the temperature adjustment method and apparatus according to the present disclosure may optimize the rate reduction effect.

Referring to FIG. 9, it is assumed that the middle rate time zone is present in 12:00 to 13:00. Depending on whether the energy management device 160 charges the ESS battery using the external electrical power in the middle rate time zone, the power quantity of the ESS battery that can be charged in the high rate time zone after 13:00 varies. In the second case in which the ESS battery is charged during 12:00 to 13:00, there is an advantage in that the larger power quantity of the ESS battery may be used through the rate of the middle rate time zone until 17:00, which is the high rate time zone.

Figure 10A:
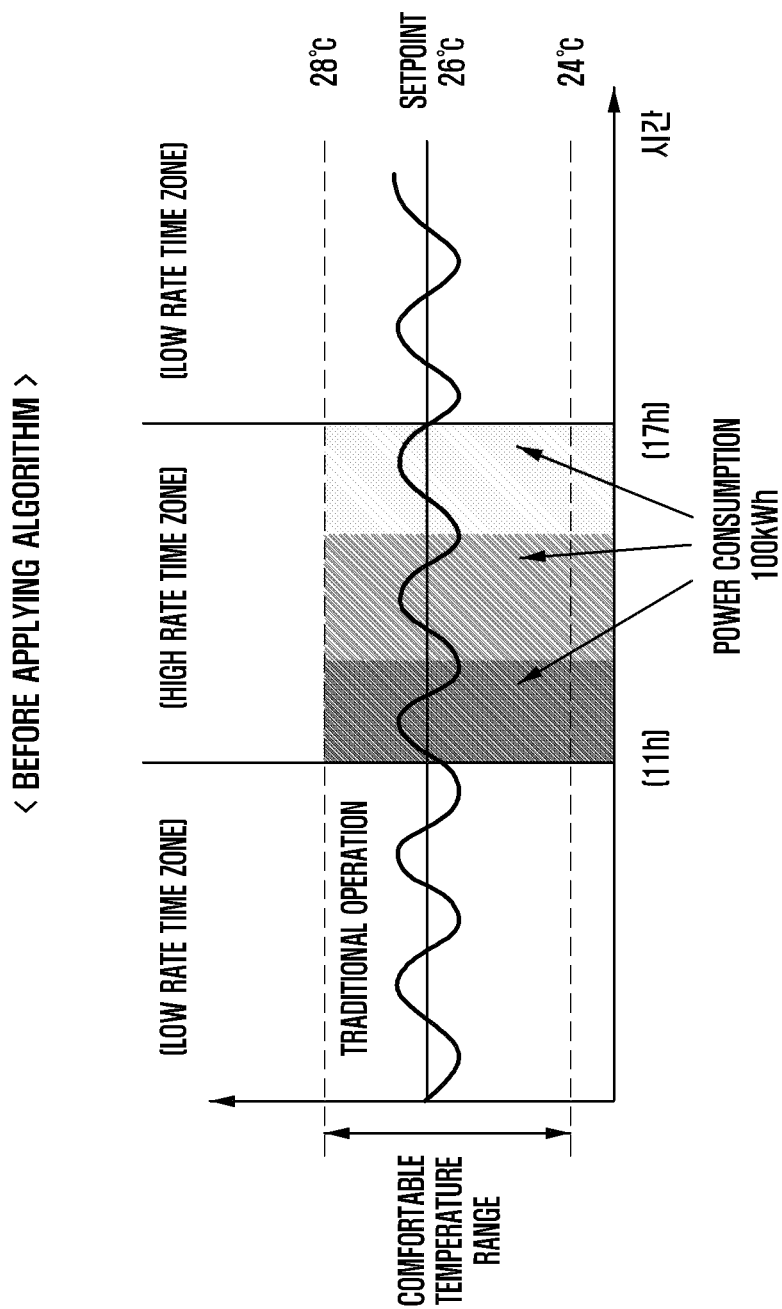
FIGS. 10A, 10B, and 10C illustrate a case of comparing before and after states of an energy management device in the form of a temperature adjustment apparatus according to an embodiment of the present disclosure, scheduling a discharging power quantity of an ESS battery.
Figure 10B:
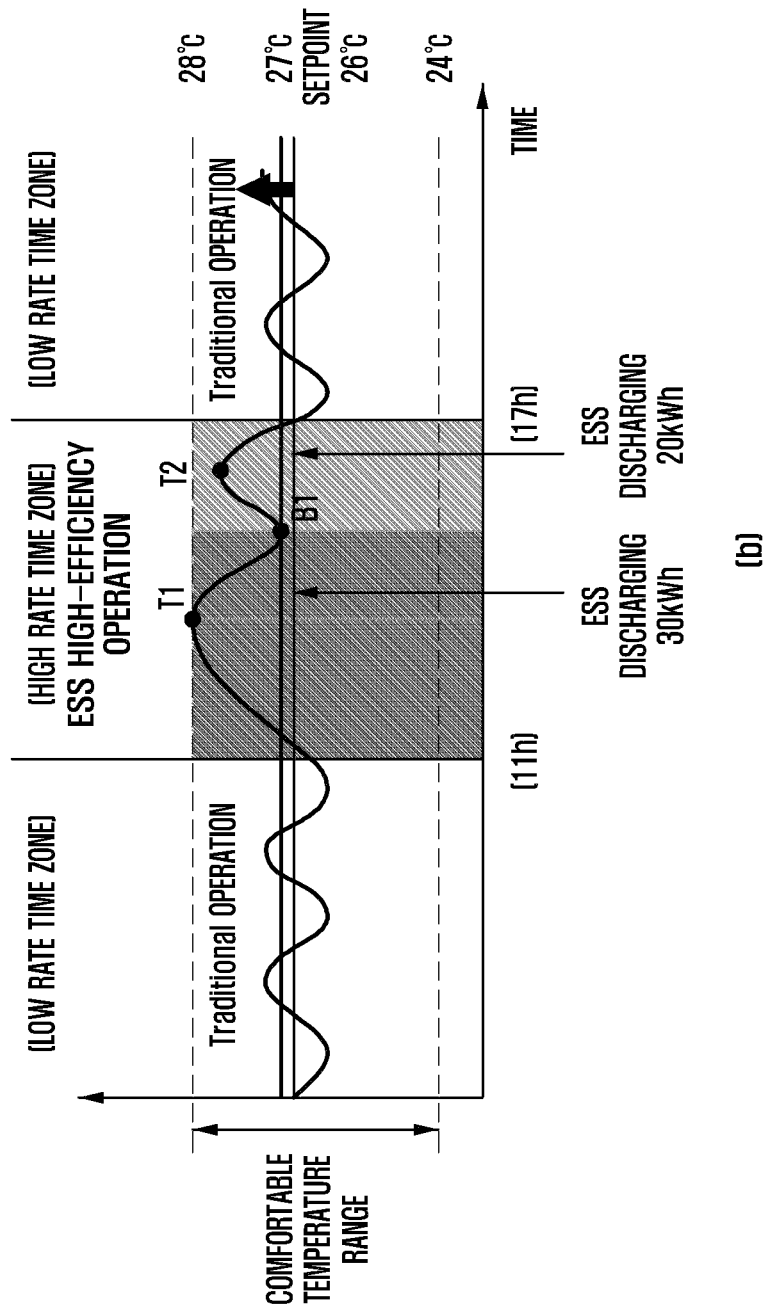
Figure 10C:
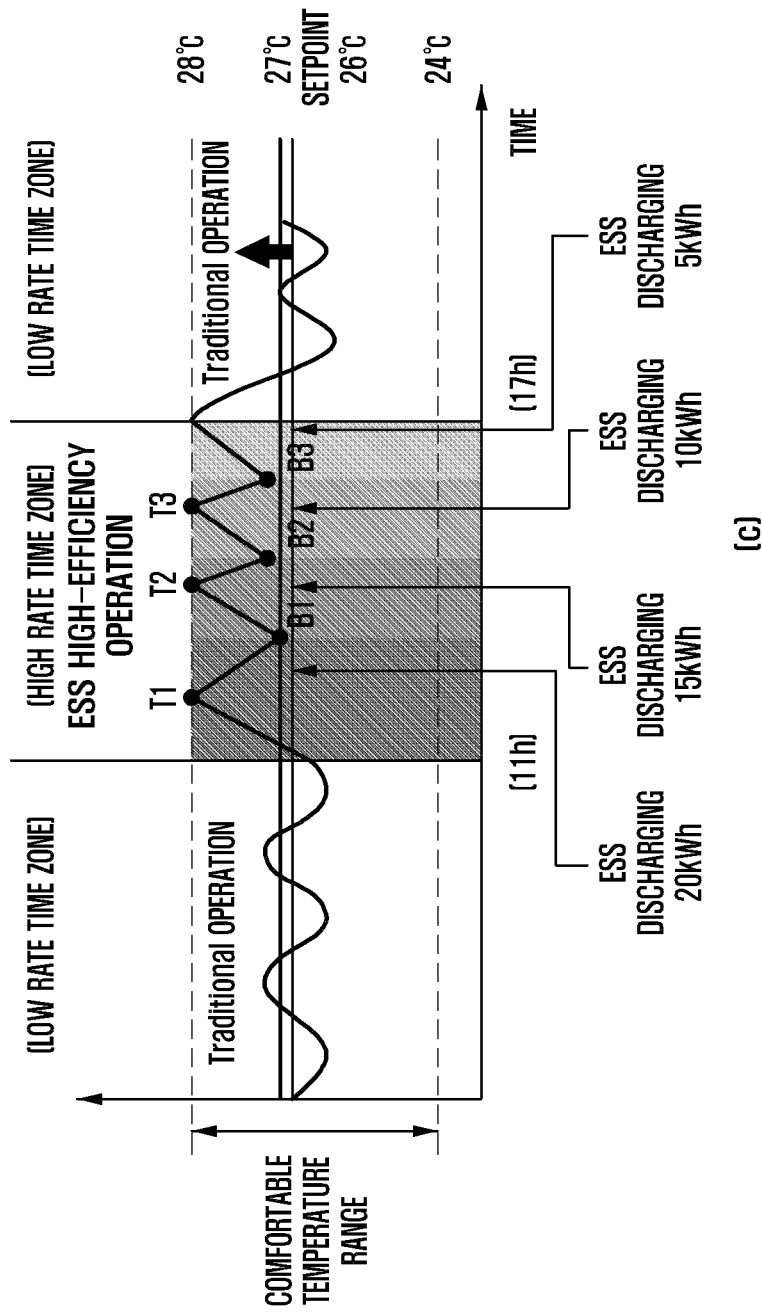

FIGS. 10A, 10B, and 10C illustrate a case of comparing a method for driving an HVAC system without an ESS according to the prior art and a method in which an energy management device, according to an embodiment of the present disclosure, schedules the discharging power quantity of an ESS battery and drives the HVAC system.

More specifically, FIG. 10A illustrates a case before applying a discharging algorithm of the ESS battery, FIG. 10B illustrates a case of applying the discharging algorithm on a cool day, and FIG. 10C illustrates a case of applying the discharging algorithm on a hot day. In FIG. 10, it is assumed that the capacity of the ESS battery is 50 kWh.

In FIG. 10A, the operation of the traditional HVAC system is performed in all zones regardless of the rate over time. The HVAC system is driven using external electrical power in all zones without applying the ESS. That is, the energy management device 160 drives the HVAC system with only the external electrical power, without considering the power demand of a user, the power rate over time, the power consumption of the HVAC system, and weather information. Thus, there is no rate reduction effect, and there is an unnecessary waste of electrical power.

In FIGS. 10B and FIG. 10C, cases in which the discharging power quantities of the ESS battery on a cool day and a hot day are scheduled and compared. As described above, the energy management device 160 predicts the temperature change pattern after the test operation, using information obtained by the test operation and information stored in advance in the storage unit. The gradients of the temperature change pattern and the temperature increase factors, which are the information obtained by the test operation on the cool day and the hot day, are different from each other, and therefore the temperature change pattern predicted by the energy management device 160 varies.

For example, on the cool day, the temperature increase gradient is gentle in the test operation zone, and therefore the temperature change pattern that has the gentle gradient may be predicted. The discharging power quantity of the ESS battery may be distributed based on the power consumption of the HVAC system predicted based on the predicted temperature change pattern and the period of the predicted temperature change pattern.

For example, on the hot day, the critical temperature increase gradient is obtained in the test operation zone compared to the cool day, and therefore the temperature change pattern having the critical gradient may be predicted. Due to the critical gradient, it can be seen that the period of the temperature change pattern is shortened. Based on the result obtained in such a manner that the energy management device 160 distributes the discharging power quantity of the ESS battery based on the period of the predicted temperature change pattern, the smaller power quantity is distributed over several periods, unlike the cool day.

Figure 11:
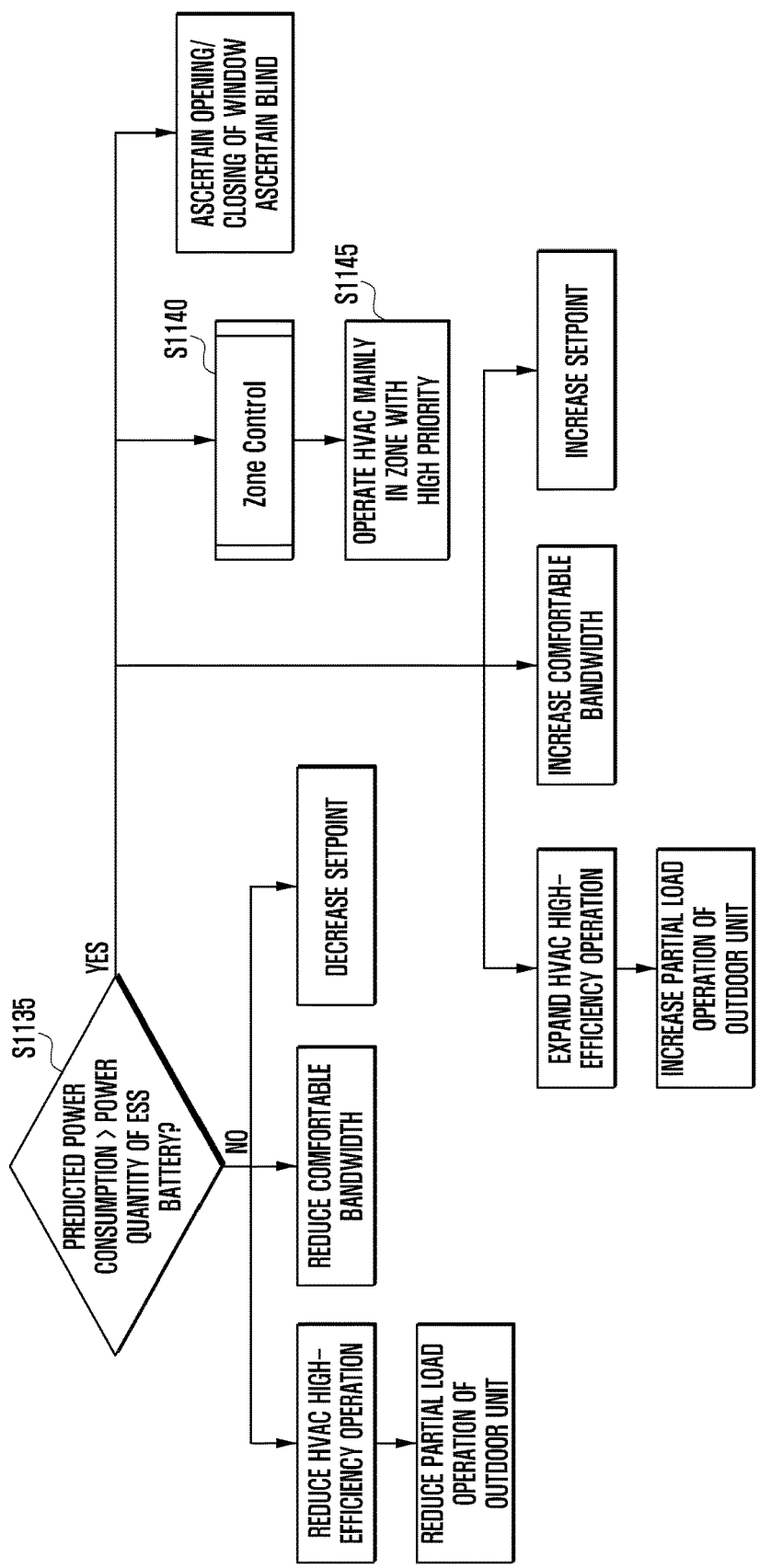
FIG. 11 illustrates the operation of an energy management device in the form of a temperature adjustment apparatus showing a comparison result between a predicted power consumption of an HVAC system and a power quantity of an ESS battery.

FIG. 11 illustrates the operation of an energy management device in accordance with the comparison result between the predicted power consumption of an HVAC system according to an embodiment of the present disclosure and the power quantity of an ESS battery.

In operation S1135, the energy management device 160 may compare the predicted power consumption of the HVAC system with the power quantity of the ESS battery, in order to perform scheduling for distributing the discharging power quantity of the ESS battery based on the predicted power consumption of the HVAC system in operation S335 of FIG. 3. That is, based on the comparison result between the predicted power consumption of the HVAC system and the power quantity of the ESS battery, it is possible to adjust factors which affect the discharging power quantity of the ESS battery. The factors which affect the discharging power quantity of the ESS battery may include at least one of a partial load operation of an outdoor unit, a comfortable bandwidth, and a setpoint.

When the predicted power consumption is not higher than the charging power quantity of the ESS battery based on the comparison result, the energy management device 160 may reduce the high-efficiency operation of the HVAC system and may thereby reduce the partial load operation of the outdoor unit. In addition, the energy management device 160 may reduce the comfortable bandwidth and lower the setpoint, so that the low temperature may be adjusted to be maintained on average. Thus, the energy management device 160 may adjust the larger electrical power than the predicted power consumption from the ESS battery to be used, so that the charging power quantity of the ESS battery may be adjusted to be used without the residual quantity. Through such an operation of the HVAC system, the energy management device 160 may increase a Return On Investment (ROI) of the ESS.

However, when the predicted power consumption is higher than the charging power quantity of the ESS battery based on the comparison result, the energy management device 160 may expand the high-efficiency operation of the HVAC system and may thereby increase the partial load operation of the outdoor unit. In addition, the energy management device 160 may increase the comfortable bandwidth and increase the setpoint. In addition, in operation S1140, the energy management device 160 may operate the HVAC system mainly in zones with high priorities by adjusting the operation of the HVAC system for each zone of a building, and stop the operation of the HVAC system in zones other than the zones with high priorities. The operation of the HVAC system will be described in detail in FIG. 12.

In addition, the energy management device 160 may ascertain the opening and closing of a window using a detection sensor or the like which is installed in the window, and ascertain the state of a blind using a detection sensor or the like which is installed in the blind in the same manner. The energy management device 160 may make a request to allow a user to close the window or pull down the blind by notifying the user of the ascertained result using a warning sound or an alarm sound, so that an environment may be created in which the HVAC system is efficiently operated.

By the above-described operation of the energy management device 160, it is possible to prevent the generation of an excess rate using the external electrical power when the power consumption of the HVAC system exceeds the charging power quantity of the ESS battery. In addition, the energy management device 160 may efficiently use the charging power quantity of the ESS battery that is smaller than the predicted power consumption.

Figure 12A:
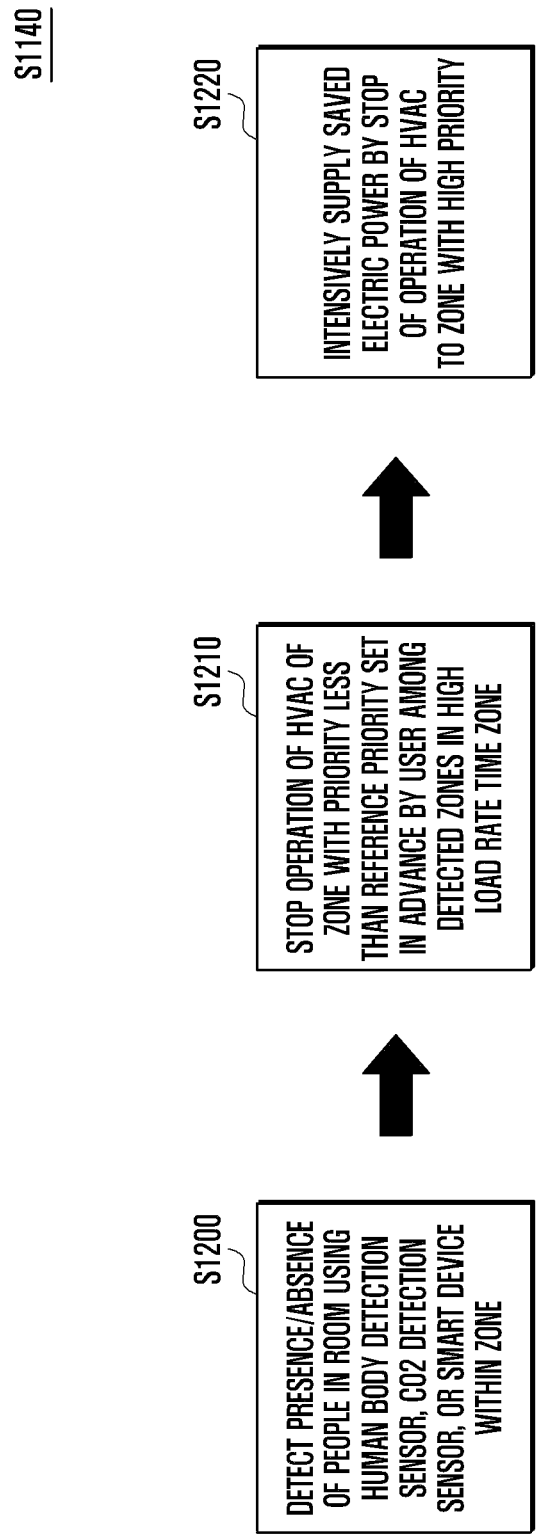
FIGS. 12A and 12B illustrate a case in which an energy management device in the form of a temperature adjustment apparatus according to an embodiment of the present disclosure, controlling an operation of an HVAC system for each zone.
Figure 12B:
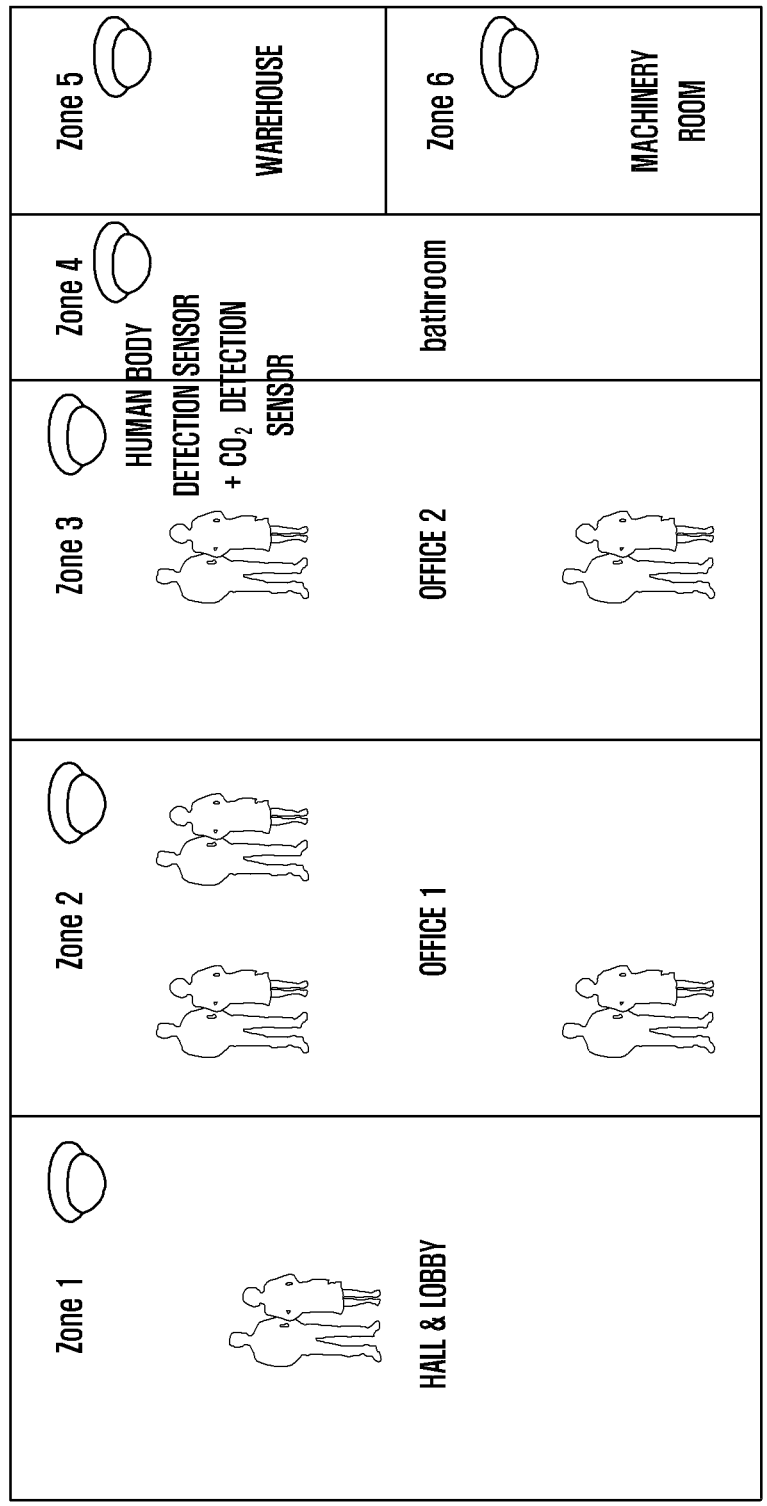

FIGS. 12A and 12B illustrate a case in which an energy management device, according to an embodiment of the present disclosure controls the operation of an HVAC system for each zone in operation S1140 of FIG. 11.

FIG. 12A is a flowchart illustrating a process for controlling to first operate the HVAC system in zones with high priorities. The energy management device 160 uses the above-described method as a method for addressing the limited capacity of the ESS battery. That is, the energy management device 160 may preferentially stop the operation of the HVAC system in zones in which there are no people in rooms having low priorities, and may apply the exceptional condition for preventing the stop of the operation of the HVAC system to zones with high priorities, which are input by a user. In addition, the energy management device 160 may intensively supply, to the zones with high priorities, the electrical power which has been saved by the above-described operation, so that the efficient distribution of the limited electrical power is possible.

More specifically, in operation S1200, the energy management device 160 may detect the presence/absence of people in the rooms through at least one of a human body detection sensor within the zone, a $CO_2$ detection sensor within the zone, and whether the energy management device 160 is connected to a smart device. The energy management device 160 may detect whether there is a movement of the people in the room based on the presence of the people in the room, using the human body detection sensor. In addition, the energy management device 160 may determine the air quality within the zone using the $CO_2$ detection sensor, and may ascertain the density of the people in the room using the determined air quality. The energy management device 160 may correct an error in the result ascertained by the $CO_2$ detection sensor, using the human body detection sensor. The energy management device 160 may determine whether the user of the corresponding floor resides there, using whether the energy management device 160 is connected to a smart device, records, or the like. The energy management device 160 may correct an error in the result obtained by detecting whether the energy management device 160 is connected to a smart device, records, or the like, using the human body detection sensor.

In operation S1210, the energy management device 160 may stop the operation of the HVAC system in the zones with priorities less than a reference priority set in advance by a user among the zones detected in the high load rate time zone. The energy management device 160 may determine a reference floor mainly in business facilities, receive in advance the priorities for each zone from the user, and store the received priorities in the storage unit. For example, a user may assign a high priority to a place in which people goes in and out frequently and a place in which a big problem occurs when the operation of the HVAC system is stopped. In addition, the energy management device 160 may receive in advance, from a user, a reference priority to which the exceptional condition for preventing the stop of the operation of the HVAC system is applied, and store the received reference priority in the storage unit. Even when the absence of the people in the room is detected by the above-described plurality of sensors, the energy management device 160 may not stop the operation of the HVAC system in the zones with priorities equal to or higher than the reference priority to which the exceptional condition for preventing the stop of the operation of the HVAC system is applied. For example, as to the priorities for each zone of a large market, a food corner, a merchandise display corner, a hall and lobby, a parking lot, and a warehouse may have a higher priority in the stated order. In addition, as to the priorities of each zone of a commercial building, the office, the meeting room, the restaurant, the hall & lobby, the toilet, the underground parking lot, the machinery room, the electrical room, and the warehouse may have a higher priority in the stated order.

In operation S1220, the energy management device 160 intensively supplies, to the zones with high priorities, the electrical power which has been stored due to the stop of the operation of the HVAC system. Thus, the energy management device 160 may efficiently use the limited electrical power stored in the ESS battery.

FIG. 12B illustrates a case in which the HVAC system is first operated in the zones with high priorities. The human body detection sensor and the CO2 detection sensor are present for each zone. It is assumed that the priorities for each zone are set in advance by a user in such a manner that hall and lobby, an office 1, an office 2, a bathroom, a warehouse, and a machinery room have the higher priorities in the stated order. The zones in which there is no people in the room, which have been ascertained by the plurality of sensors, are the zones 4, 5, and 6, which are the toilet, the warehouse, and the machinery room, and the priorities of these zones respectively correspond to '4', '5', and '6' among the six zones. The energy management device may receive in advance, from a user, an input of the reference priority to which the exceptional condition for preventing the stop of the operation of the HVAC system is applied. When the reference priority is 3, the energy management device 160 stops the operation of the HVAC system in all of the zones in which there is no people in the room. However, for example, when a user sets the reference priority as being '4' in the energy management device 160, the toilet is set as being '4' even when there is no people in the toilet, and therefore the energy management device 160 may not stop the operation of the HVAC system. The energy management device 160 may supply, to the hall and lobby or office with high priorities, the electrical power saved by stopping the operation of the HVAC system. Thus, more efficient electrical power operation within the capacity of the ESS battery for each zone is possible.

Figure 13:
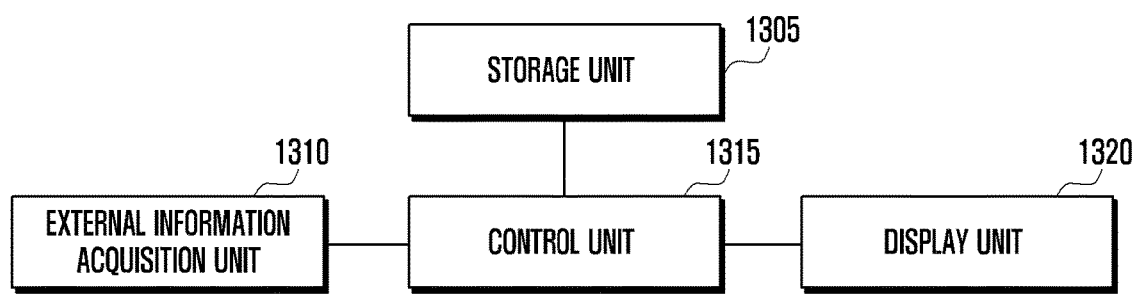
FIG. 13 is a block diagram illustrating the internal structure of an energy management device, which is a temperature adjustment apparatus according to an embodiment of the present disclosure.

FIG. 13 is a block diagram illustrating the internal structure of an energy management device according to an embodiment of the present disclosure.

Referring to FIG. 13, the energy management device 160 according to the present disclosure includes a storage unit 1305, an external information acquisition unit 1310, a control unit 1315, and a display unit 1320.

The storage unit 1305 stores information required for the control of the energy management device 160. The storage unit 1305 may store the information stored in advance and all the information acquired by the external information acquisition unit 1310. The information stored in advance may be the past DB. The past DB may include temperature increase factors for each of the past dates and indoor temperature change pattern information depending on a temperature adjustment of the HVAC system by a user's setting. The past DB may further include information about the power consumption of the HVAC system over time for each date. The temperature increase factor may include at least one of the number of people in the room, the temperature of the people in the room, a difference between indoor and outdoor temperatures, building thermal conductivity, a heat generator, indoor humidity, an opening degree of a building, a solar radiation heat cutoff degree, and the density of adjacent buildings. The control unit 1315 may control the ESS and the like using the information stored in the storage unit 1305.

The external information acquisition unit 1310 may acquire the temperature change pattern and the temperature increase factor information through the operation of the HVAC system. The acquired temperature increase factor may include at least one of the number of people in the room, the temperature of the people in the room, a difference between indoor and outdoor temperatures, building thermal conductivity, a heat generator, indoor humidity, an opening degree of a building, a solar radiation heat cutoff degree, and the density of adjacent buildings. In addition, the external information acquisition unit 1310 acquires information about the type, characteristics, and residual capacity of the battery. In addition, the external information acquisition unit 1310 may acquire past power consumption information of the HVAC system, and may further acquire a prediction of electrical power demand, power rate, weather information, and characteristic information of the ESS battery.

The control unit 1315 controls the overall operations of the energy management device according to an embodiment of the present disclosure. The control unit 1315 controls to extract the indoor temperature change pattern from the information stored in advance based on the information acquired through the test operation of the HVAC system in the high load rate time zone (e.g., a first rate time zone), predict the temperature change pattern of the first rate time zone which is reached after the test operation based on the extracted indoor temperature change pattern, predict the power consumption of the HVAC system based on the predicted temperature change pattern, and schedule the discharging power quantity of the ESS battery based on the predicted power consumption of the HVAC system in the first rate time zone which is reached after the test operation.

In addition, the control unit 1315 controls to charge the ESS battery using the external electrical power in a second rate time zone when the second rate time zone is between the first rate time zone, which is reached after the test operation, and decreases the temperature by operating the HVAC system using the external electrical power in the second rate time zone.

In addition, the control unit 1315 controls to detect the presence/absence of the people in the room for each zone when the predicted power consumption of the HVAC system exceeds the storage capacity of the battery inside the ESS, determine whether to stop the operation of the HVAC system of the zone in which the absence of the people in the room is detected, and stop the operation of the HVAC system based on the determined result.

The temperature adjustment method according to an embodiment of the present disclosure may be implemented in the form of program commands which can be performed through various computer means, and may be recorded in a computer-readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Video Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware devices may be configured to operate as one or more software modules to perform the operations of the present disclosure, and vice versa.

Although exemplary embodiments of the present disclosure have been shown and described in this specification and the drawings, they are used in general sense in order to easily explain technical contents of the present disclosure, and to help comprehension of the present disclosure, and are not intended to limit the scope of the present disclosure. It is obvious to those skilled in the art to which the present disclosure pertains that other modified embodiments on the basis of the spirits of the present disclosure besides the embodiments disclosed herein can be carried out.

What is claimed is:

1. A method of adjusting an indoor temperature, comprising:
    acquiring an indoor temperature change pattern based on information acquired by operating a heating, ventilation, and air conditioning (HVAC) system in a first rate time zone;
    predicting a temperature change pattern of the first rate time zone based on the acquired indoor temperature change pattern;
    predicting power consumption of the HVAC system based on the predicted temperature change pattern;
    scheduling a discharging power quantity of an energy storage system (ESS) battery based on the predicted power consumption of the HVAC system in the first rate time zone; and
    controlling operation of the HVAC system in a specific area, determined based on a priority of each area to reduce the power consumption, if the predicted power consumption of the HVAC system exceeds a storage capacity of the ESS battery,
    wherein the first rate time zone is a time zone when electrical charges are higher than predetermined charges.

2. The method of claim 1, wherein:
    the acquired information includes a gradient of the indoor temperature change pattern, which is recorded by increasing and decreasing the indoor temperature within a preset temperature range in a zone of the operation and a temperature increase factor;
    the indoor temperature change pattern is acquired based on stored information including a temperature increase factor and an indoor temperature change pattern for each of a plurality of past dates; and
    the acquiring of the indoor temperature change pattern from the stored information includes:
        determining dates having a same temperature increase factor as the indoor temperature increase factor, and
        determining the indoor temperature change pattern that has the most similar gradient to the gradient among the indoor temperature change patterns of the determined dates.

3. The method of claim 2, wherein the predicting of the temperature change pattern includes
    correcting an error determined based on the gradient of the indoor temperature change pattern for each of the determined dates and the gradient, and determining the gradient of the temperature change pattern,
    determining a period of the temperature change pattern using the determined gradient, and
    predicting the temperature change pattern using the determined period.

4. The method of claim 2, wherein:
    the stored information further includes power consumption of the HVAC system over time for each date; and
    the predicting of the power consumption of the HVAC system includes
        determining power consumption of the HVAC system over time on a date on which the temperature change pattern is determined from the stored information in advance, and
        predicting power consumption of the HVAC system over time in a high rate time zone, in consideration of the determined power consumption of the HVAC over time and the predicted temperature change pattern.

5. The method of claim 1, wherein the scheduling of the discharging power quantity of the battery includes:
    acquiring information about the discharging power quantity of the battery from a battery management device, and
    distributing the acquired information about the discharging power quantity of the battery over time in the first rate time zone based on the predicted power consumption of the HVAC system.

6. The method of claim 1, if a second rate time zone is present between the first rate time zones, further comprising:
    charging the ESS battery using external electrical power in the second rate time zone; and
    decreasing the indoor temperature by operating the HVAC system using the external electrical power in the second rate time zone.

7. The method of claim 6, wherein a rate per unit supply power in the second rate time zone is lower than a rate of the first rate time zone.

8. The method of claim 1, wherein the predicting of the power consumption of the HVAC system and the scheduling of the discharging power quantity of the battery include:
    acquiring, from the outside, information of any one of prediction of an electrical power demand, a power rate, weather information, and characteristics of the ESS, and
    additionally considering at least any one of the information acquired from the outside.

9. The method of claim 1, further comprising:
identifying a presence of people in a room for each area, if the predicted power consumption of the HVAC system exceeds a storage capacity of the ESS battery;
determining whether to stop the operation of the HVAC system in an area based on the presence of people in the room for each area; and
controlling the operation of the HVAC system based on a result of the determination to reduce the power consumption.

10. A temperature adjustment apparatus for adjusting an indoor temperature, the temperature adjustment apparatus comprising:
an external information acquisition unit configured to acquire information from the outside;
a memory configured to store the acquired information and information stored; and
a controller that configured to: acquire an indoor temperature change pattern based on information acquired by operating a heating, ventilation, and air conditioning (HVAC) system in a first rate time zone; predict a temperature change pattern in the first rate time zone based on the acquired indoor temperature change pattern; predict power consumption of the HVAC system based on the predicted temperature change pattern; schedule a discharging power quantity of an energy storage system (ESS) battery based on the predicted power consumption of the HVAC system in the first rate time zone and control the operation of the HVAC system in a specific area, determined based on a priority of each area to reduce the power consumption, if the predicted power consumption of the HVAC system exceeds a storage capacity of the ESS battery,
wherein the first rate time zone is a time zone when electrical charges are higher than predetermined charges.

11. The temperature adjustment apparatus of claim 10, wherein:
the acquired information includes a gradient of the indoor temperature change pattern, which is recorded by increasing and decreasing the indoor temperature within a preset temperature range in a zone of the operation and a temperature increase factor;
wherein the indoor temperature change pattern is acquired based on stored information including a temperature increase factor and an indoor temperature change pattern for each of a plurality of past dates; and
wherein the acquiring of the indoor temperature change pattern from the stored information includes
determining dates having a same temperature increase factor as the indoor temperature increase factor, and
determining the temperature change pattern having the most similar gradient to the gradient among the indoor temperature change patterns of the determined dates.

12. The temperature adjustment apparatus of claim 11, wherein the predicting of the temperature change pattern includes:
correcting an error determined based on the gradient of the indoor temperature change pattern for each of the determined dates and the gradient, and determining the gradient of the temperature change pattern,
determining a period of the temperature change pattern using the determined gradient, and
predicting the temperature change pattern using the determined period.

13. The temperature adjustment apparatus of claim 11, wherein:
the stored information further includes power consumption of the HVAC system over time for each date; and
the predicting of the power consumption of the HVAC system includes
determining power consumption of the HVAC system over time on a date on which the temperature change pattern is determined from the stored information, and
predicting power consumption of the HVAC system over time in a high rate time zone in consideration of the determined power consumption of the HVAC over time and the predicted temperature change pattern.

14. The temperature adjustment apparatus of claim 10, wherein the schedule of a discharging power quantity of the ESS battery includes:
acquiring information about the discharging power quantity of the ESS battery from a battery management device, and
distributing the acquired information about the discharging power quantity of the ESS battery over time in the first rate time zone based on the predicted power consumption of the HVAC system.

15. The temperature adjustment apparatus of claim 10, wherein, if a second rate time zone is present between the first rate time zones, the controller is further configured to charge the ESS battery using external electrical power in the second rate time zone, and decrease the indoor temperature by operating the HVAC system using the external electrical power in the second rate time zone.

16. The temperature adjustment apparatus of claim 15, wherein a rate per unit supply power in the second rate time zone is lower than a rate of the first rate time zone.

17. The temperature adjustment apparatus of claim 10, wherein the prediction of power consumption of the HVAC system and the schedule of a discharging power quantity of the ESS battery include:
acquiring, from the outside, information of any one of prediction of an electrical power demand, a power rate, weather information, and characteristics of the ESS battery, and
additionally considering at least any one of the information acquired from the outside.

18. The temperature adjustment apparatus of claim 10, wherein, the controller is further configured to: identify a presence of people in a room for each area, if the predicted power consumption of the HVAC system exceeds a storage capacity of the ESS battery, determine whether to stop the operation of the HVAC system in an area based on the presence of people in the room for each area, and control the operation of the HVAC system based on a result of the determining to reduce the power consumption.

* * * * *